UNITED STATES PATENT OFFICE.

PAUL JULIUS, OF LUDWIGSHAFEN-ON-THE-RHINE, GERMANY, ASSIGNOR TO THE BADISCHE ANILIN AND SODA FABRIK, OF SAME PLACE.

RED DYE.

SPECIFICATION forming part of Letters Patent No. 447,189, dated February 24, 1891.

Application filed October 31, 1890. Serial No. 369,959. (Specimens.) Patented in Germany December 13, 1889, No. 52,596.

*To all whom it may concern:*

Be it known that I, PAUL JULIUS, doctor of philosophy, a subject of the Emperor of Austria, residing at Ludwigshafen-on-the-Rhine, in the Kingdom of Bavaria and Empire of Germany, have invented new and useful Improvements in the Manufacture of a Red Substantive Dye, (which has been patented to me in Germany by patent No. 52,596, dated December 13, 1889,) of which the following is a specification.

This invention is based upon the discovery that a new derivative of diamidodiphenylene ketone, which I have discovered can by appropriate treatment be made to yield a new red dye-stuff, which dyes cotton from the alkaline bath a red color without the aid of a mordant. The said new derivative is a ketoxime, and results from the action of hydroxylamine or hydroxylamine sulpho-acids upon the said diamidodiphenylene ketone.

For the sake of convenience I give the following directions for the preparation of the ketoxime, starting from paradinitrodiphenylene ketone, a body described in the *Annalen der Chemie*, vol. 203, p. 104. By "parts" throughout the specification is meant parts by weight. About one part of paradinitrodiphenylene ketone is mixed with about ten parts of alcohol and then reduced with about ten parts of solution of sodium sulphide, ($Na_2S+9H_2O$.) The reduction is effected at the boiling-point of the mixture, and the alcohol is subsequently distilled off and the residue extracted with dilute hydrochloric acid, whereby a solution of the chlorhydrate of the amido ketone or ketone base is obtained and a residue of sulphur remains. From the hot solution the free ketone base is precipitated by adding the requisite quantity of calcined soda, and on cooling is obtained as a brown crystalline powder, which is filtered, washed with water, pressed, and dried. Next about twenty-one parts of diamidodiphenylene ketone thus obtained are dissolved in a hot mixture of about thirty-five parts of hydrochloric acid (containing about twenty per cent. real hydrochloric acid, HCl) diluted with about sixteen hundred parts of water. To this solution a concentrated aqueous solution of about ten parts of hydroxylamine chlorhydrate is added, and the whole is allowed to cool down to the ordinary temperature. Any precipitate consisting of the hydrochlorate of the base which may separate out should be kept suspended in the liquor. Next about sixty-three and a half parts of caustic soda (containing about thirty-five per cent. NaOH) are gradually added in small portions at the time, and during this addition the temperature is raised to about 60° to 70° celsius. The addition of the first portions of caustic soda will cause a precipitation of the ketonic base; but this will begin to redissolve as the solution becomes more alkaline. After all the caustic soda has been added the mixture is brought to the boil and kept gently boiling until the base is redissolved, or nearly so. It is then filtered, if necessary, and in any case to the clear yellowish-brown solution thus obtained sufficient hydrochloric acid (containing about twenty per cent. real hydrochloric acid, HCl) is added to precipitate the ketoxime base. (About forty-four to forty-eight parts will be necessary.) An excess of the acid is to be carefully avoided, as it will redissolve the base. The ketoxime base is collected on the filter, washed and pressed. If the product be dried, the operation must be carefully conducted at a low temperature, as it is otherwise liable to undergo changes which cause a deterioration in quality. It is therefore advisable to keep and use the ketoxime in the condition of a pulp or paste. In the above process the hydroxylamine hydrochlorate may be replaced by rather more than the equivalent quantity of its sulpho acids, (*Annalen der Chemie*, vol. 241, pp. 181 and seq.,) which, acting similarly, give the same final product.

Now I do not claim this new ketoxime base in this application for Letters Patent; but my present invention relates to the production of a new red dye-stuff from the said base. This dye-stuff belongs to the class of diazo compounds, and as an example to illustrate the nature of my invention and the manner in which it can be carried into practical effect I give the following directions for the manufacture of my new red dye-stuff: Dissolve about fortyfive (45) parts of diamidodiphenylene ketoxime, (dry weight,) obtained as above described, in a mixture of about one hundred and seventy (170) parts of hydrochloric acid (containing about thirty-eight per cent. real hydrochloric acid, HCl) and about four hundred and fifty (450) parts of water. Keep cool with ice and add gradually a solution of about twenty-eight (28) parts of sodium nitrite in about three hundred and sixty (360) parts of water. In this way a solution of the tetrazo compound of diamidodiphenylene ketoxime is obtained. Run this solution into about one hundred and thirty (130) parts, by weight, of crystallized sodium naphthionate and about one hundred and twenty (120) parts, by weight, of crystallized sodium acetate dissolved in about three thousand (3,000) parts, by weight, of water, to which two thousand (2,000) parts of ice are added. Stir for, say, about three days, add soda till alkaline, boil, and salt out the dye-stuff formed. If necessary, purify by redissolving and reprecipitating. My new red dye-stuff thus obtained in the form of a sodium salt is a dark-colored powder giving a brown streak on rubbing, readily soluble in both cold and hot water, yielding bluish-red solutions, almost insoluble in absolute alcohol even on boiling, insoluble (or practically so) in benzine and ether, soluble in concentrated sulphuric acid, yielding a blue solution, which on the addition of water gives a blue precipitate. If an aqueous solution containing about one per cent. of dye-stuff be treated with hydrochloric acid, a blue precipitate of the coloring-matter in the form of its free acid is obtained. In this form it is practically insoluble in water and cannot be used for dyeing unmordanted vegetable fiber without previous reconversion into the commercial form of soluble sodium salt. Chloride-of-calcium solution added to the aqueous solution gives a brownish-red precipitate. Copper chloride in the same way gives a dark-brown purple precipitate. Caustic soda causes the separation of a bluish-red precipitate in the solution.

The class of the ketoximes was discovered by Victor Meyer in 1882 and the following years, and his discoveries are described in the *Berichte der deutschen chemischen Gesellschaft*, (vol. 15, pp. 1324, 2778, vol. 16, pp. 823, 1784, &c.) They are the oximes of the ketones. The simplest ketone is acetone or dimethyl-ketone. Its oxime is called "acetooxime" or "dimethylketoxime."

Dimethyl ketone is represented by the formula $CH_3COCH_3$ and its ketoxime by the formula $CH_3C(NOH)CH_3$. Methylethyl ketone is represented by $CH_3COC_2H_5$ and its ketoxime by $CH_3C(NOH)C_2H_5$. If ketones are represented by the formula R.CO.R', then the corresponding ketoximes would be $RC(NOH)R'$.

What I claim as new, and desire to secure by Letters Patent, is—

As a new article of manufacture, the substantive red dye-stuff, (sodium salt of diamido-diphenylene ketoxime diazo-naphthionic acid,) which appears in the form of a dark-colored powder giving a brown streak on rubbing; it is readily soluble in both cold and hot water, yielding bluish-red solutions; it is almost insoluble in alcohol even on boiling; insoluble (or practically so) in benzine and ether; it dissolves in concentrated sulphuric acid, giving a blue solution, which on the addition of water gives a blue precipitate; chloride of calcium gives a brownish-red precipitate, and copper chloride a dark brownish-purple one, all substantially as hereinbefore described.

In testimony whereof I have hereunto set my hand in the presence of two subscribing witnesses.

PAUL JULIUS.

Witnesses:
ERNEST F. EHRHARDT,
CARL KLOTZ.